US012676992B2

(12) United States Patent
Hendry

(10) Patent No.: US 12,676,992 B2
(45) Date of Patent: *Jul. 7, 2026

(54) IMAGE DECODING METHOD AND APPARATUS FOR CODING IMAGE INFORMATION INCLUDING PICTURE HEADER

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,552

(22) Filed: May 31, 2024

(65) Prior Publication Data

US 2024/0323403 A1     Sep. 26, 2024

Related U.S. Application Data

(63) Continuation of application No. 18/213,052, filed on Jun. 22, 2023, now Pat. No. 12,034,939, which is a continuation of application No. 17/712,454, filed on Apr. 4, 2022, now Pat. No. 11,729,402, which is a continuation of application No. PCT/KR2020/019319, filed on Dec. 29, 2020.

(60) Provisional application No. 62/956,634, filed on Jan. 2, 2020.

(51) Int. Cl.
H04N 19/174     (2014.01)
H04N 19/169     (2014.01)
H04N 19/44      (2014.01)
H04N 19/70      (2014.01)

(52) U.S. Cl.
CPC ......... *H04N 19/174* (2014.11); *H04N 19/188* (2014.11); *H04N 19/44* (2014.11); *H04N 19/70* (2014.11)

(58) Field of Classification Search
CPC ...................................................... H04N 19/30
See application file for complete search history.

(56) References Cited

U.S. PATENT DOCUMENTS

2006/0050793 A1     3/2006   Wang et al.
2013/0343465 A1*   12/2013   Chen ...................... H04N 19/70
                                                                      375/240.24
2015/0085938 A1     3/2015   Hendry et al.
2015/0245075 A1     8/2015   Lee et al.
                              (Continued)

FOREIGN PATENT DOCUMENTS

CN           104137561 A      11/2014
CN           104303503 A       1/2015

OTHER PUBLICATIONS

Sjöberg et al.(AHG9: Picture header enabled flag, Joint Video Experts Team (JVET) of ITU-T SG 16 WP3 and ISOMEC JTC 1/SC 29/WG 11, JVET-90426-v1, Dec. 31, 2019 (Year: 2019).*
                              (Continued)

*Primary Examiner* — Fabio S Lima
(74) *Attorney, Agent, or Firm* — Fish & Richardson P.C.

(57)     ABSTRACT

An image decoding method performed by a decoding apparatus according to the present document comprises the steps of: acquiring a flag indicating whether a picture header (PH) network abstraction layer (NAL) unit exists; acquiring a PH on the basis of the flag; and decoding a current picture related to the PH on the basis of the PH.

3 Claims, 12 Drawing Sheets

(56)                References Cited

U.S. PATENT DOCUMENTS

| | | | |
|---|---|---|---|
| 2017/0220283 A1* | 8/2017 | Zhang | H04N 19/423 |
| 2021/0144384 A1* | 5/2021 | Sjöberg | H04N 19/174 |

OTHER PUBLICATIONS

Office Action in Japanese Appln. No. 2024-079258, mailed on Mar. 11, 2025, 11 pages.

Esenlik et al., "AHG9: Cleanup of Picture Header Syntax Structure in Slice Header," JVET-R0210, Joint Video Experts Team (JVET) of ITU-T SG 16 WP 3 and ISO/IEC JTC 1/SC 29/WG 11, 18th Meeting: by teleconference, AT, Apr. 15-24, 2020, 3 pages.

Bross et al., "Versatile Video Coding (Draft 8)," JVET-Q2001-vE, Joint Video Experts Team (JVET) of ITU-T SG 16 WP 3 and ISO/IEC JTC 1/SC 29/WG 11, 17th Meeting: Brussels, BE, Jan. 7-17, 2020, 511 pages.

Bross et al., "Versatile Video Coding (Draft 7)," JVET-P2001-vE, Joint Video Experts Team (JVET) of ITU-T SG 16 WP 3 and ISO/IEC JTC 1/SC 29/WG 11, 16th Meeting, Geneva, CH, Oct. 1-11, 2019, 488 pages.

Choi et al., "AHG9/AHG12: On signaling of subpicture partitioning in SPS," JVET-R0118-v2, Joint Video Experts Team (JVET) of ITU-T SG 16 WP3 and ISO/IEC JTC 1/SC 29/WG 11, 18th Meeting, Teleconference, Apr. 15-24, 2020, 3 pages.

Jung et al., "AHG9: On slice level control of LMCS and explicit scaling list," JVET-R0089-v1, Joint Video Experts Team (JVET) of ITU-T Sg 16 WP 3 and ISO/IEC JTC 1/SC 29/WG 11, 18th Meeting, Teleconference, Apr. 15-24, 2020, 5 pages.

Li et al., "AHG 9: On picture header," JVET-Q0419-v1, Joint Video Experts Team (JVET) of ITU-T SG 16 WP 3 and ISO/IEC JTC 1/SC 29/WG 11, 17th Meeting, Brussels, BE, Jan. 7-17, 2020, 5 pages.

Notice of Allowance in Japanese Appln. No. 2022-540948, mailed on Jul. 9, 2024, 4 pages (with English translation).

Office Action in Canadian Appln. No. 3166542, mailed on Jun. 14, 2024, 5 pages.

Office Action in Chinese Appln. No. 202080097941.5, mailed on Jul. 31, 2024, 8 pages.

Office Action in European Appln. No. 20908948.1, mailed on Sep. 3, 2024, 7 pages.

* cited by examiner

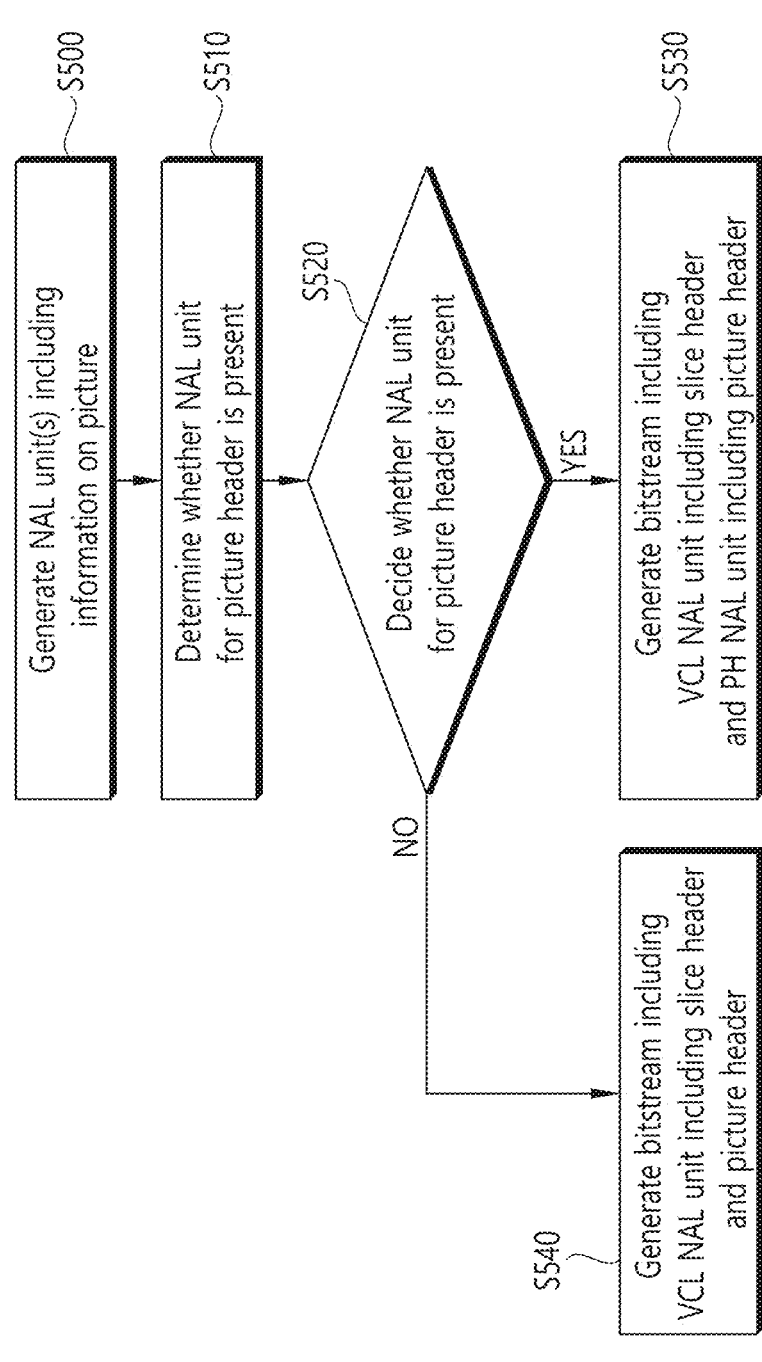

S500
Generate NAL unit(s) including information on picture

S510
Determine whether NAL unit for picture header is present

S520
Decide whether NAL unit for picture header is present

YES

S530
Generate bitstream including VCL NAL unit including slice header and PH NAL unit including picture header

NO

S540
Generate bitstream including VCL NAL unit including slice header and picture header

FIG. 7

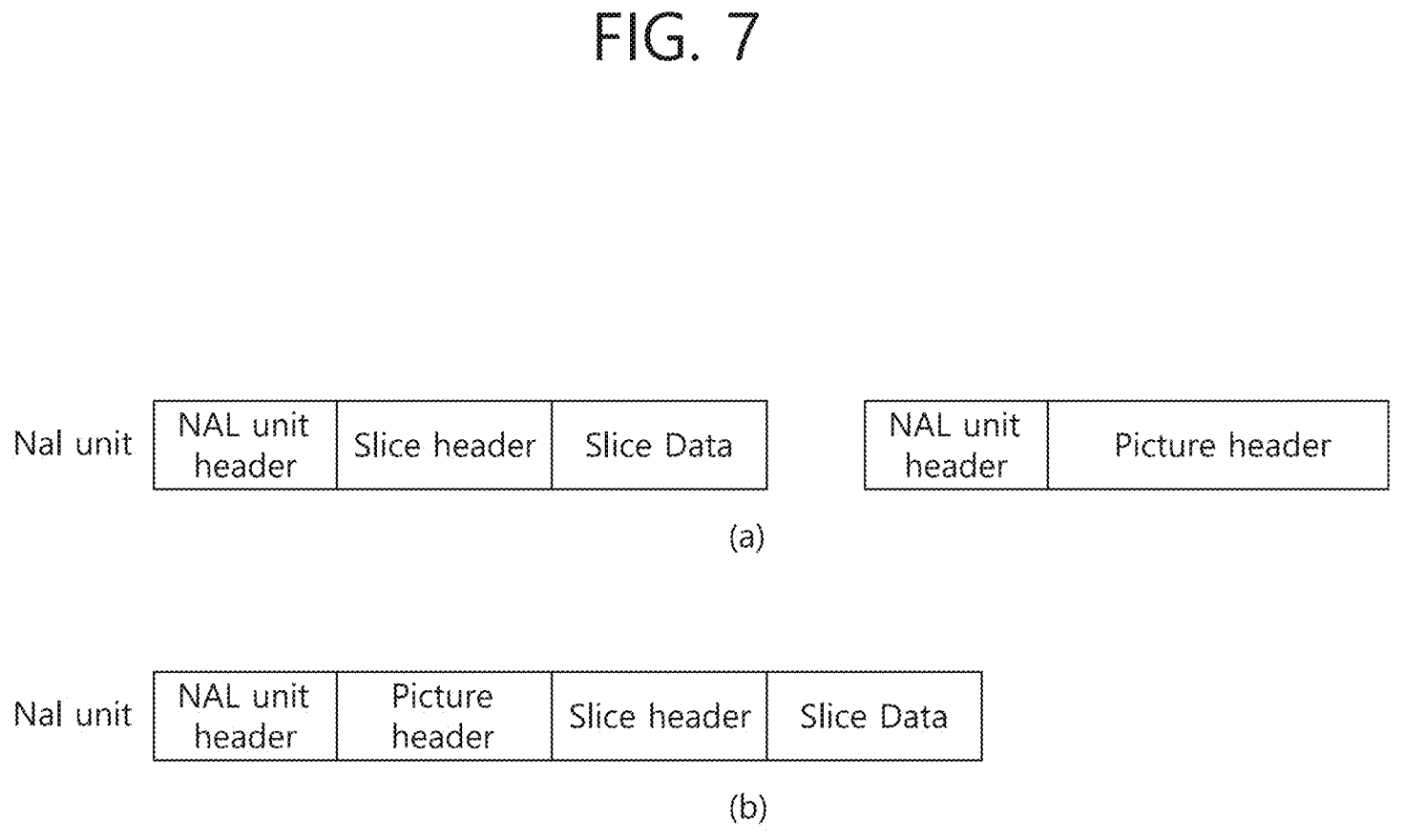

Nal unit

| NAL unit header | Slice header | Slice Data |
|---|---|---|

| | NAL unit header | Picture header |
|---|---|---|

(a)

Nal unit

| NAL unit header | Picture header | Slice header | Slice Data |
|---|---|---|---|

(b)

Determine whether PH NAL unit including PH related to current picture is present — S800

Generates flag for whether PH NAL unit is present based on result of determination — S810

Encode image information including flag — S820

Obtain flag for whether PH NAL unit is present ——S1000

Obtain PH based on flag ——S1010

Decode current picture
related to PH based on PH ——S1020

IMAGE DECODING METHOD AND APPARATUS FOR CODING IMAGE INFORMATION INCLUDING PICTURE HEADER

CROSS-REFERENCE TO RELATED APPLICATIONS

This application is a continuation of U.S. application Ser. No. 18/213,052, filed on Jun. 22, 2023, which is a continuation of U.S. application Ser. No. 17/712,454, filed on Apr. 4, 2022, now U.S. Pat. No. 11,729,402, which is a continuation pursuant to 35 U.S.C. § 119(e) of International Application PCT/KR2020/019319, with an international filing date of Dec. 29, 2020, which claims the benefit of U.S. Provisional Patent Application No. 62/956,634, filed on Jan. 2, 2020, the contents of which are hereby incorporated by reference herein in their entirety.

BACKGROUND OF THE DISCLOSURE

Field of the Disclosure

The present disclosure relates to image coding technology, and more specifically, to a video decoding method and apparatus for adaptively coding a PH NAL unit in an image coding system.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

A technical object of the present disclosure is to provide a method and apparatus for improving image coding efficiency.

Another technical object of the present disclosure is to provide a method and an apparatus for coding a flag indicating presence or absence of a PH NAL unit.

According to an embodiment of the present disclosure, an image decoding method performed by a decoding apparatus is provided. The method includes obtaining a flag for whether a Picture Header (PH) Network Abstraction Layer (NAL) unit is present, obtaining a PH based on the flag and decoding a current picture related to the PH based on the PH.

According to another embodiment of the present disclosure, a decoding apparatus performing image decoding is provided. The decoding apparatus includes an entropy decoder configured to obtain a flag for whether a Picture Header (PH) Network Abstraction Layer (NAL) unit is present, to obtain a PH based on the flag, and a predictor configured to decode a current picture related to the PH based on the PH.

According to another embodiment of the present disclosure, a video encoding method performed by an encoding apparatus is provided. The method includes determining whether a Picture Header (PH) Network Abstraction Layer (NAL) unit including a PH related to a current picture is present, generating a flag for whether the PH NAL unit is present based on a result of the determination and encoding image information including the flag.

According to another embodiment of the present disclosure, a video encoding apparatus is provided. The encoding apparatus includes an entropy encoder configured to determine whether a Picture Header (PH) Network Abstraction Layer (NAL) unit including a PH related to a current picture is present, to generate a flag for whether the PH NAL unit is present based on a result of the determination and to encode image information including the flag.

According to another embodiment of the present disclosure, a computer-readable digital storage medium storing a bitstream including image information and causing an image decoding method to be executed is provided. In the computer-readable digital storage medium, the image decoding method includes obtaining a flag for whether a Picture Header (PH) Network Abstraction Layer (NAL) unit is present, obtaining a PH based on the flag and decoding a current picture related to the PH based on the PH.

According to the present disclosure, it is possible to signal a flag indicating presence or absence of a PH NAL unit, control a NAL unit adaptively to a bit rate of a bitstream based on the flag and improve overall coding efficiency.

According to the present disclosure, it is possible to set constraints on the number of slices in a current picture and constraints on presence of a PH NAL unit for related pictures based on a flag indicating presence or absence of a PH NAL unit to control a NAL unit adaptively to a bit rate of a bitstream, improving overall coding efficiency.

BRIEF DESCRIPTION OF THE DRAWINGS

FIG. 2 is a schematic diagram illustrating a configuration of a video/image encoding apparatus to which the embodiment(s) of the present disclosure may be applied.

FIG. 5 schematically shows an encoding procedure according to an embodiment of the present disclosure.

FIG. 7 schematically shows a picture header configuration in a NAL unit according to presence or absence of a PH NAL unit.

DESCRIPTION OF EMBODIMENTS

Figure 1:
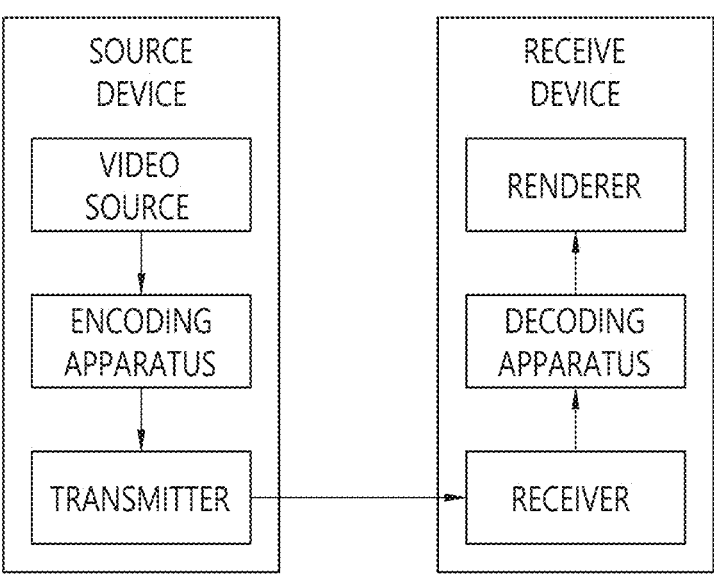
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (ie, intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
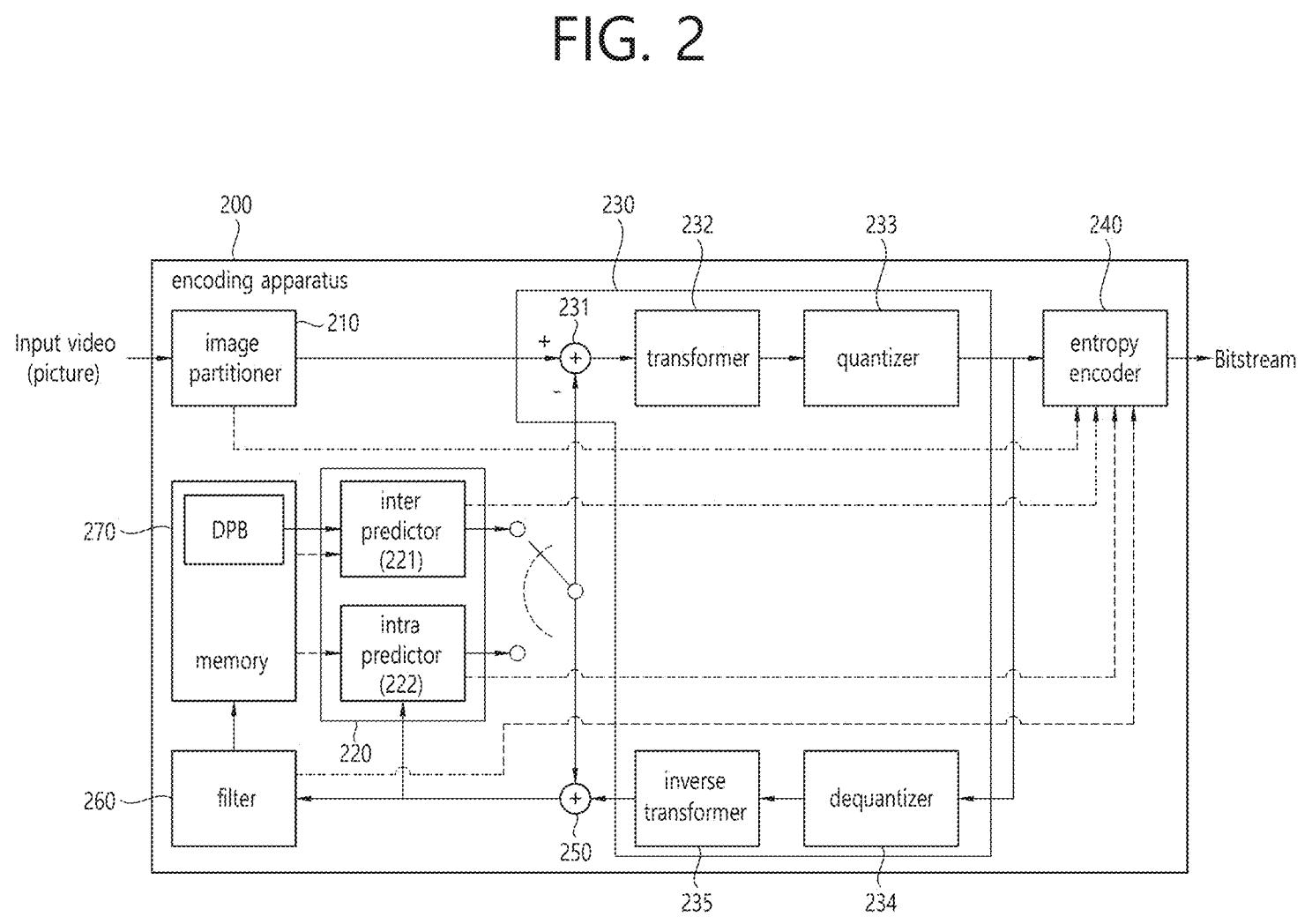

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
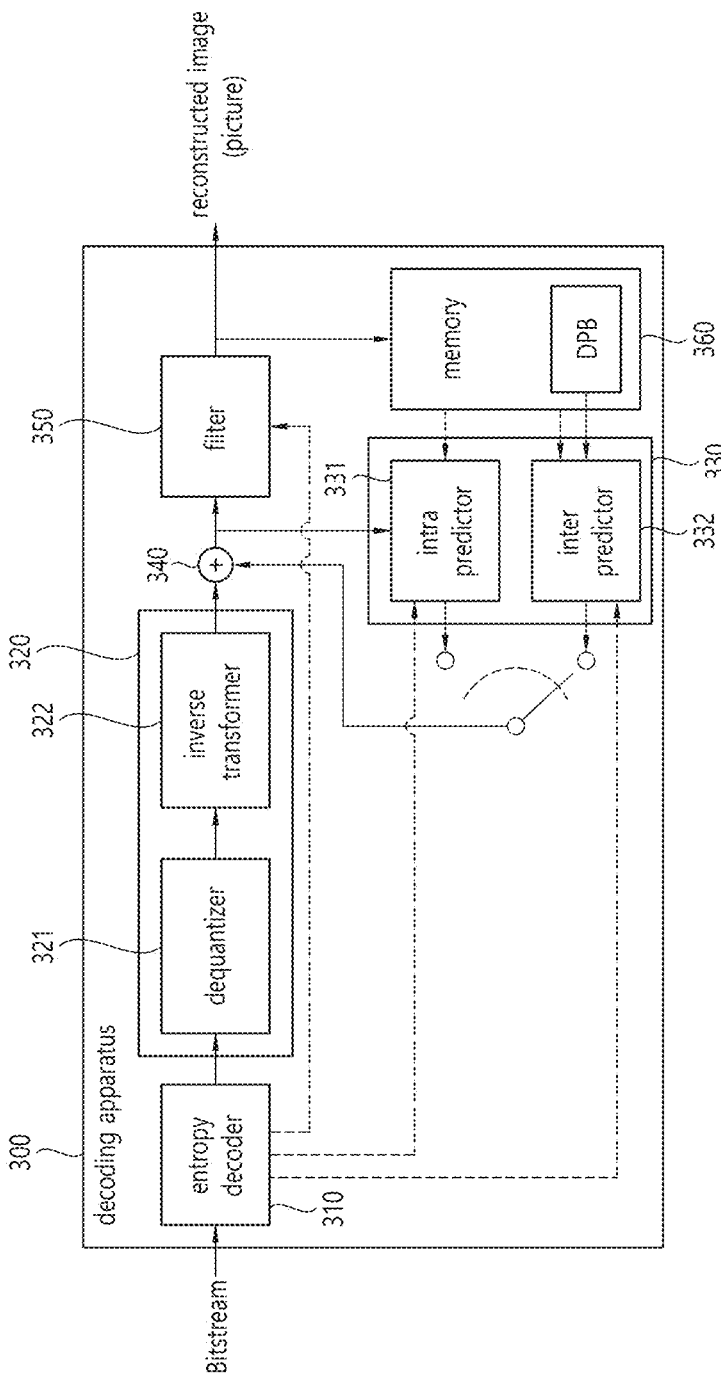
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

Figure 4:
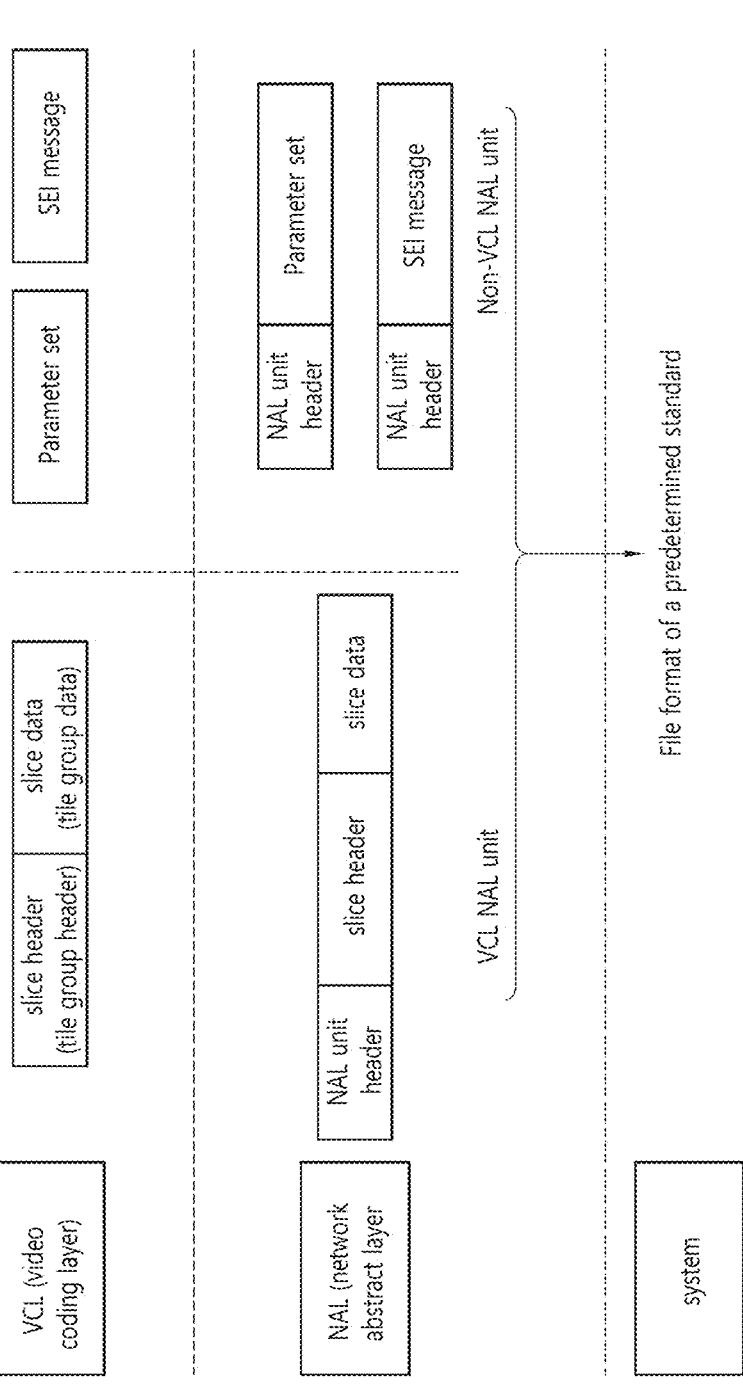
FIG. 4 schematically shows a hierarchical structure of coded image information.

FIG. 4 schematically shows a hierarchical structure of coded image information.

FIG. 4 may schematically show a video/image coded according to a coding layer and structure of the present disclosure. Referring to FIG. 4, the coded video/image may be divided into a video coding layer (VCL) that processes the video/image and a video/image decoding process, a subsystem that transmits and stores coded information, and a network abstraction layer (NAL) that is present between the VCL and the subsystem and is in charge of functions.

For example, in the VCL, VCL data including compressed image data (slice data) may be generated, or a picture parameter set (PPS), a sequence parameter set (SPS), a video parameter set (VPS) or a parameter set including a supplemental enhancement information (SEI) message additionally required for an image decoding process may be generated.

For example, in the NAL, a NAL unit may be generated by adding header information (NAL unit header) to a raw byte sequence payload (RBSP) generated in the VCL. In this case, the RBSP may refer to the slice data, the parameter set, the SEI message, and the like generated in the VCL. The NAL unit header may include NAL unit type information specified according to RBSP data included in the corresponding NAL unit.

For example, as shown in FIG. 4, a NAL unit may be classified into a VCL NAL unit and a non-VCL NAL unit according to the RBSP generated in the VCL. The VCL NAL unit may refer to a NAL unit including information (slice data) on an image and the non-VCL NAL unit may refer to a NAL unit including information (a parameter set or an SEI message) required for image decoding.

Header information may be attached to the above-described VCL NAL unit and non-VCL NAL unit according to a data standard of the subsystem and the VCL NAL unit and the non-VCL NAL unit including the header information may be transmitted through a network. For example, a NAL unit may be converted into a data format of a predetermined standard such as H.266/VVC file format, real-time transport protocol (RTP), transport stream (TS), or the like and transmitted over various networks.

In addition, as described above, the type of a NAL unit may be specified according to an RBSP data structure included in the NAL unit, and information on the NAL unit type may be stored and signaled in a NAL unit header.

For example, a NAL unit may be classified into a VCL NAL unit type and a non-VCL NAL unit type according to whether it includes information (slice data) on an image. In addition, the VCL NAL unit type may be classified according to characteristics and types of pictures included in the VCL NAL unit, and the non-VCL NAL unit type may be classified according to the type of a parameter set.

The following may be an example of NAL unit types specified according to the type of a parameter set included in the non-VCL NAL unit type.

Adaptation parameter set (APS) NAL unit: Type for a NAL unit including an APS

Decoding parameter set (DPS) NAL unit: Type for a NAL unit including a DPS

Video parameter set (VPS) NAL unit: Type for a NAL unit including a VPS

Sequence parameter set (SPS) NAL unit: Type for a NAL unit including an SPS

Picture parameter set (PPS) NAL unit: Type for a NAL unit including a PPS

Picture header (PH) NAL unit: Type for a NAL unit including a PH

The above-described NAL unit types may have syntax information on the NAL unit types, and the syntax information may be stored and signaled in a NAL unit header. For example, the syntax information may be nal_unit_type, and the NAL unit type may be specified as a nal_unit_type value.

Meanwhile, as described above, one picture may include a plurality of slices, and a slice may include a slice header and slice data. In this case, one picture header may be added (embedded) for a plurality of slices (a set of slice headers and slice data). The picture header (picture header syntax) may include information/parameters that can be commonly applied to pictures. The slice header (slice header syntax) may include information/parameters that can be commonly applied to slices. The APS (APS syntax) or the PPS (PPS syntax) may include information/parameters that can be commonly applied to one or more slices or pictures. The SPS (SPS syntax) may include information/parameters that can be commonly applied to one or more sequences. The VPS (VPS syntax) may include information/parameters that can be commonly applied to a plurality of layers. The DPS (DPS syntax) may include information/parameters that can be commonly applied to the entire image. The DPS may include information/parameters related to concatenation of a coded video sequence (CVS). In the present disclosure, a high level syntax (HLS) may include at least one of the APS syntax, the PPS syntax, the SPS syntax, the VPS syntax, the DPS syntax, the picture header syntax, and the slice header syntax.

Meanwhile, as described above, one NAL unit type may be set for one picture, in general, and the NAL unit type may be signaled through nal_unit_type in the NAL unit header of the NAL unit including slices, as described above. The following table shows an example of NAL unit type code and NAL unit type class.

TABLE 1

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture | VCL |
| 8 | IDR_N_LP | slice_layer_rbsp( ) | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DPS_NUT | Decoding parameter set decoding_parameter_set_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set | non-VCL |
| 18 | SUFFIX_APS_NUT | adaptation_parameter_set_rbsp( ) | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information | non-VCL |
| 24 | SUFFIX_SEI_NUT | sei_rbsp( ) | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

Meanwhile, as described above, a picture may be composed of one or more slices. In addition, parameters describing the picture may be signaled through a picture header (PH), and parameters describing a slice may be signaled through a slice header (SH). The PH may be delivered in its own NAL unit type. Further, the SH may be present at the beginning of a NAL unit including a payload of a slice (i.e., slice data).

For example, syntax elements of a signaled PH may be as follows.

TABLE 2

| | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_subpic_id_present_flag && !sps_subpic_id_signalling_flag ) { | |
|     ph_subpic_id_signalling_present_flag | u(1) |

TABLE 2-continued

| | Descriptor |
|---|---|
| if( ph_subpics_id_signalling_present_flag ) { | |
|    ph_subpic_id_len_minus1 | ue(v) |
|    for( i = 0; i <= sps_num_subpics_minus1; i++ ) | |
|       ph_subpic_id[ i ] | u(v) |
|    } | |
| } | |
| if( !sps_loop_filter_across_virtual_boundaries_disabled_present_flag ) { | |
|    ph_loop_filter_across_virtual_boundaries_disabled_present_flag | u(1) |
|    if( ph_loop_filter_across_virtual_boundaries_disabled_present_flag ) { | |
|       ph_num_ver_virtual_boundaries | u(2) |
|       for( i = 0; i < ph_num_ver_virtual_boundaries; i++ ) | |
|          ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|          ph_virtual_boundaries_pos_y[ i ] | u(13) |
|    } | |
| } | |
| if( separate_colour_plane_flag = = 1 ) | |
|    colour_plane_id | u(2) |
| if( output_flag_present_flag ) | |
|    pic_output_flag | u(1) |
| pic_rpl_present_flag | u(1) |
| if( pic_rpl_present_flag ) { | |
|    for( i = 0; i < 2; i++ ) { | |
|       if( num_ref_pic_lists_in_sps[ i ] > 0 && !pps_ref_pic_list_sps_idc[ i ] && | |
|           ( i = = 0 \| \| ( i = = 1 && rpl1_idx_present_flag ) ) ) | |
|          pic_rpl_sps_flag[ i ] | u(1) |
|       if( pic_rpl_sps_flag[ i ] ) { | |
|          if( num_ref_pic_lists_in_sps[ i ] > 1 && | |
|             ( i = = 0 \| \| ( i = = 1 && rpl1_idx_present_flag ) ) ) | |
|            pic_rpl_idx[ i ] | u(v) |
|       } else | |
|          ref_pic_list_struct( i, num_ref_pic_lists_in_sps[ i ] ) | |
|       for( j = 0; j < NumLtrpEntries[ i ][ RplsIdx[ i ] ]; j++ ) { | |
|          if( ltrp_in_slice_header_flag[ i ][ RplsIdx[ i ] ] ) | |
|            pic_poc_lsb_lt[ i ][ j ] | u(v) |
|          pic_delta_poc_msb_present_flag[ i ][ j ] | u(1) |
|          if( pic_delta_poc_msb_present_flag[ i ][ j ] ) | |
|            pic_delta_poc_msb_cycle_lt[ i ][ j ] | ue(v) |
|       } | |
|       } | |
|    } | |
| } | |
| if( partition_constraints_override_enabled_flag ) { | |
|    partition_constraints_override_flag | ue(v) |
|    if( partition_constraints_override_flag ) { | |
|       pic_log2_diff_min_qt_min_cb_intra_slice_luma | ue(v) |
|       pic_log2_diff_min_qt_min_cb_inter_slice | ue(v) |
|       pic_max_mtt_hierarchy_depth_inter_slice | ue(v) |
|       pic_max_mtt_hierarchy_depth_intra_slice_luma | ue(v) |
|       if( pic_max_mtt_hierarchy_depth_intra_slice_luma != 0 ) { | |
|          pic_log2_diff_max_bt_min_qt_intra_slice_luma | ue(v) |
|          pic_log2_diff_max_tt_min_qt_intra_slice_luma | ue(v) |
|       } | |
|       if( pic_max_mtt_hierarchy_depth_inter_slice != 0 ) { | |
|          pic_log2_diff_max_bt_min_qt_inter_slice | ue(v) |
|          pic_log2_diff_max_tt_min_qt_inter_slice | ue(v) |
|       } | |
|       if( qtbtt_dual_tree_intra_flag ) { | |
|          pic_log2_diff_min_qt_min_cb_intra_slice_chroma | ue(v) |
|          pic_max_mtt_hierarchy_depth_intra_slice_chroma | ue(v) |
|          if( pic_max_mtt_hierarchy_depth_intra_slice_chroma != 0 ) { | |
|            pic_log2_diff_max_bt_min_qt_intra_slice_chroma | ue(v) |
|            pic_log2_diff_max_tt_min_qt_intra_slice_chroma | ue(v) |
|          } | |
|       } | |
|    } | |
| } | |
| if( cu_qp_delta_enabled_flag ) { | |
|    pic_cu_qp_delta_subdiv_intra_slice | ue(v) |
|    pic_cu_qp_delta_subdiv_inter_slice | ue(v) |
| } | |
| if( pps_cu_chroma_qp_offset_list_enabled_flag ) { | |
|    pic_cu_chroma_qp_offset_subdiv_intra_slice | ue(v) |
|    pic_cu_chroma_qp_offset_subdiv_inter_slice | ue(v) |
| } | |
| if( sps_temporal_mvp_enabled_flag ) | |
|    pic_temporal_mvp_enabled_flag | u(1) |

TABLE 2-continued

| | Descriptor |
|---|---|
| if(!pps_mvd_l1_zero_idc ) | |
|   mvd_l1_zero_flag | u(1) |
| if( !pps_six_minus_max_num_merge_cand_plus1 ) | |
|   pic_six_minus_max_num_merge_cand | ue(v) |
| if( sps_affine_enabled_flag ) | |
|   pic_five_minus_max_num_subblock_merge_cand | ue(v) |
| if( sps_fpel_mmvd_enabled_flag ) | |
|   pic_fpel_mmvd_enabled_flag | u(1) |
| if( sps_bdof_pic_present_flag ) | |
|   pic_disable_bdof_flag | u(1) |
| if( sps_dmvr_pic_present_flag ) | |
|   pic_disable_dmvr_flag | u(1) |
| if( sps_prof_pic_present_flag ) | |
|   pic_disable_prof_flag | u(1) |
| if( sps_triangle_enabled_flag && MaxNumMergeCand >= 2 && | |
|     !pps_max_num_merge_cand_minus_max_num_triangle_cand_plus1 ) | |
|   pic_max_num_merge_cand_minus_max_num_triangle_cand | ue(v) |
| if ( sps_ibc_enabled_flag ) | |
|   pic_six_minus_max_num_ibc_merge_cand | ue(v) |
| if( sps_joint_cbcr_enabled_flag ) | |
|   pic_joint_cbcr_sign_flag | u(1) |
| if( sps_sao_enabled_flag ) { | |
|   pic_sao_enabled_present_flag | u(1) |
|   if( pic_sao_enabled_present_flag ) { | |
|     pic_sao_luma_enabled_flag | u(1) |
|     if(ChromaArrayType != 0 ) | |
|       pic_sao_chroma_enabled_flag | u(1) |
|     } | |
|   } | |
| if( sps_alf_enabled_flag ) { | |
|   pic_alf_enabled_present_flag | u(1) |
|   if( pic_alf_enabled_present_flag ) { | |
|     pic_alf_enabled_flag | u(1) |
|     if( pic_alf_enabled_flag ) { | |
|       pic_num_alf_aps_ids_luma | u(3) |
|       for( i = 0; i < pic_num_alf_aps_ids_luma; i++ ) | |
|         pic_alf_aps_id_luma[ i ] | u(3) |
|       if( ChromaArrayType != 0 ) | |
|         pic_alf_chroma_idc | u(2) |
|       if( pic_alf_chroma_idc ) | |
|         pic_alf_aps_id_chroma | u(3) |
|       } | |
|     } | |
|   } | |
| if ( !pps_dep_quant_enabled_flag ) | |
|   pic_dep_quant_enabled_flag | u(1) |
| if( !pic_dep_quant_enabled_flag ) | |
|   sign_data_hiding_enabled_flag | u(1) |
| if( deblocking_filter_override_enabled_flag ) { | |
|   pic_deblocking_filter_override_present_flag | u(1) |
|   if( pic_deblocking_filter_override_present_flag ) { | |
|     pic_deblocking_filter_override_flag | u(1) |
|     if( pic_deblocking_filter_override_flag ) { | |
|       pic_deblocking_filter_disabled_flag | u(1) |
|       if( !pic_deblocking_filter_disabled_flag ) { | |
|         pic_beta_offset_div2 | se(v) |
|         pic_tc_offset_div2 | se(v) |
|       } | |
|     } | |
|   } | |
|   } | |
| if( sps_lmcs_enabled_flag ) { | |
|   pic_lmcs_enabled_flag | u(1) |
|   if( pic_lmcs_enabled_flag ) { | |
|     pic_lmcs_aps_id | u(2) |
|     if( ChromaArrayType != 0 ) | |
|       pic_chroma_residual_scale_flag | u(1) |
|     } | |
|   } | |
| if( sps_scaling_list_enabled_flag ) { | |
|   pic_scaling_list_present_flag | u(1) |
|   if( pic_scaling_list_present_flag ) | |
|     pic_scaling_list_aps_id | u(3) |
|   } | |

TABLE 2-continued

| | Descriptor |
|---|---|
| if( picture_header_extension_present_flag ) { | |
|   ph_extension_length | ue(v) |
|   for( i = 0; i < ph_extension_length; i++) | |
|     ph_extension_data_byte[ i ] | u(8) |
|   } | |
|   rbsp_trailing_bits( ) | |
| } | |

Meanwhile, adoption of a PH may mean that there must be at least two NAL units for every coded picture. For example, one of the two units may be a NAL unit for the PH, and the other may be a NAL unit for a coded slice including a slice header (SH) and slice data. This may be a problem for a bitstream having a low bit rate because an additional NAL unit per picture may considerably affect the bit rate. Therefore, it may be desirable for the PH to have a mode in which it does not consume new NAL units.

Accordingly, the present disclosure proposes embodiments for solving the above-described problems. The proposed embodiments may be applied individually or in combination.

As an example, a method of signaling a flag in a high level parameter set indicating presence or absence of a PH NAL unit in a coded layer video sequence (CLVS) is proposed. That is, the flag may indicate whether a picture header is present in a NAL unit (i.e., a PH NAL unit) or a slice header. Here, for example, the CLVS may mean a sequence of picture units (PUs) having the same value of nuh_layer_id. The picture unit may be a set of NAL unit(s) for a coded picture. Further, for example, the high level parameter set may be a sequence parameter set (SPS), a picture parameter set (PPS), or a slice header. The flag may be called ph_nal_present_flag. Alternatively, the flag may be referred to as a PH NAL presence flag.

In addition, with respect to the PH NAL presence flag, the present disclosure proposes an embodiment in which the value of ph_nal_present_flag is constrained to be the same for all SPSs referred to by pictures of the same CVS. The constraint may mean that the value of ph_nal_present_flag must be the same for one coded video sequence in a multi-layer bitstream.

Further, as an example, when the value of ph_nal_present_flag is equal to 1, one PH NAL unit is present, and this PH NAL unit is associated with video coding layer (VCL) NAL units of a picture.

Further, as an example, when the value of ph_nal_present_flag is equal to 0 (i.e., when a PH NAL unit is not present for each picture), a method in which the following constraints are applied is proposed.

For example, the aforementioned constraints may be as follows.

First, all pictures of CLVS may include only one slice.

Second, a PH NAL unit may not be present. A PH syntax table may be present in a slice layer RBSP along with a slice header (SH) and slice data. That is, the PH syntax table may be present in the slice header.

Third, the PH syntax table and the SH syntax table may start at a byte-aligned position. To implement this, a byte alignment bit may be added between the PH and the SH.

Fourth, the value of picture_header_extension_present_flag in all PPSs referring to a SPS may be 0.

Fifth, all syntax elements that may be present in the PH or the SH may be present in the PH instead of the SH.

Further, as an example, a method of updating access unit detection may be proposed. That is, instead of checking the PH, every new VCL NAL unit may mean a new access unit (AU). That is, when the value of ph_nal_present_flag indicates that the PH NAL unit is not present, the VCL NAL unit including ph_nal_present_flag is not a VCL NAL unit for a previous AU (i.e., a picture for the previous AU) and may mean that a VCL NAL unit for a new AU (i.e., a picture for a new AU) is parsed. Accordingly, when the value of ph_nal_present_flag indicates that the PH NAL unit is not present, the VCL NAL unit including ph_nal_present_flag may be the first VCL NAL unit for the picture of the new AU (e.g., a current picture to be decoded). Here, AU may mean a set of picture units (PUs) belonging to different layers and including coded pictures related to the same time for output of a decoded picture buffer (DPB). In addition, the PU may mean a set of NAL units including one coded picture, which are associated and have a continuous decoding order. That is, the PU may mean a set of NAL units for one coded picture, which are associated and have a continuous decoding order. Meanwhile, when a bitstream is a single layer bitstream rather than a multilayer bitstream, the AU may be the same as the PU.

The embodiments proposed in the present disclosure may be implemented as described below.

For example, an SPS syntax in which ph_nal_present_flag proposed in the embodiment of the present disclosure is signaled may be as follows.

TABLE 3

| | Descriptor |
|---|---|
| seq_parameter_set_rbsp( ) { | |
|   ... | |
|   ph_nal_present_flag | u(1) |
|   ... | |
|   } | |

Referring to Table 3, the SPS may include ph_nal_present_flag.

For example, the semantic of the syntax element ph_nal_present_flag may be as shown in the following table.

TABLE 4

...

ph_nal_present_flag equal to 1 specifies that NAL unit with nal_unit_type equal to PH_NUT is present for each coded picture in the CLVSs referring to the SPS.

TABLE 4-continued ph_nal_present_flag equal to 0 specifies that NAL unit with nal_unit_type equal to PH_NUH
is not present for each coded picture in the CLVSs referring to the SPS.
When ph_nal_present_flag is equal to 1, the following applies:
- NAL unit with nal_unit_type PH_NUT shall not be present in the CLVSs referring
to the SPS.
- Each picture in the CLVSs referring to the SPS shall contain exactly one slice.
- PH is present in slice layer RBSP.
...

For example, referring to Table 4, the syntax element ph_nal_present_flag may indicate whether a NAL unit having the same nal_unit_type as PH_NUT is present for each coded picture of CLVSs referring to the SPS. For example, ph_nal_present_flag equal to 1 may indicate that a NAL unit having the same nal_unit_type as PH_NUT is present for each coded picture of CLVSs referring to the SPS. Further, for example, ph_nal_present_flag equal to 0 may indicate that a NAL unit having the same nal_unit_type as PH_NUH is not present for each coded picture of CLVSs referring to the SPS.

Further, for example, when the ph_nal_present_flag is 1, the following may be applied.

A NAL unit having nal_unit_type of PH_NUT (i.e., a PH NAL unit) may not be present in CLVSs referring to the SPS.

Each picture of CLVSs referring to the SPS may include one slice.

PH may be present in a slice layer RBSP.

Meanwhile, although a method in which ph_nal_present_flag is signaled through the SPS is proposed in Table 3 and Table 4, the method shown in Table 3 and Table 4 is an embodiment proposed in the present disclosure, and an embodiment in which ph_nal_present_flag is signaled through a PPS or a slice header instead of the SPS may also be proposed.

Meanwhile, for example, according to an embodiment proposed in the present disclosure, the picture header syntax table and the picture header RBSP may be separately signaled as shown in the following table.

TABLE 5

| | Descriptor |
|---|---|
| picture_header_rbsp( ) { | |
|   picture_header( ) | |
|   rbsp_trailing_bits( ) | |
| } | |

Further, the signaled picture header syntax table may be as follows.

TABLE 6

| | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_subpic_id_present_flag && !sps_subpic_id_signalling_flag ) { | |
|     ph_subpic_id_signalling_present_flag | u(1) |
|     if( ph_subpics_id_signalling_present_flag ) { | |
|       ph_subpic_id_len_minus1 | ue(v) |
|       for( i = 0; i <= sps_num_subpics_minus1; i++ ) | |
|         ph_subpic_id[ i ] | u(v) |
|     } | |
|   } | |
|   if( !sps_virtual_boundaries_present_flag ) { | |
|     ph_virtual_boundaries_present_flag | u(1) |
|     if( ph_virtual_boundaries_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
|   } | |
|   if( separate_colour_plane_flag == 1 ) | |
|     colour_plane_id | u(2) |
|   if( output_flag_present_flag ) | |
|     pic_output_flag | u(1) |
|   pic_rpl_present_flag | u(1) |

TABLE 6-continued

|  | Descriptor |
|---|---|
| if( pic_rpl_present_flag ) { | |
|     for( i = 0; i < 2; i++ ) { | |
|         if( num_ref_pic_lists_in_sps[ i ] > 0 && !pps_ref_pic_list_sps_idc[ i ] && | |
|             ( i = = 0 \| \| ( i = = 1 && rpl1_idx_present_flag ) ) ) | |
|             pic_rpl_sps_flag[ i ] | u(1) |
|         if( pic_rpl_sps_flag[ i ] ) { | |
|             if( num_ref_pic_lists_in_sps[ i ] > 1 && | |
|                 ( i = = 0 \| \| ( i = = 1 && rpl1_idx_present_flag ) ) ) | |
|                 pic_rpl_idx[ i ] | u(v) |
|         } else | |
|             ref_pic_list_struct( i, num_ref_pic_lists_in_sps[ i ] ) | |
|         for( j = 0; j < NumLtrpEntries[ i ][ RplsIdx[ i ] ]; j++ ) { | |
|             if( ltrp_in_slice_header_flag[ i ][ RplsIdx[ i ] ] ) | |
|                 pic_poc_lsb_lt[ i ][ j ] | u(v) |
|             pic_delta_poc_msb_present_flag[ i ][ j ] | u(1) |
|             if( pic_delta_poc_msb_present_flag[ i ][ j ] ) | |
|                 pic_delta_poc_msb_cycle_lt[ i ][ j ] | ue(v) |
|         } | |
|         } | |
|     } | |
| } | |
| if( partition_constraints_override_enabled_flag ) { | |
|     partition_constraints_override_flag | ue(v) |
|     if( partition_constraints_override_flag ) { | |
|         pic_log2_diff_min_qt_min_cb_intra_slice_luma | ue(v) |
|         pic_log2_diff_min_qt_min_cb_inter_slice | ue(v) |
|         pic_max_mtt_hierarchy_depth_inter_slice | ue(v) |
|         pic_max_mtt_hierarchy_depth_intra_slice_luma | ue(v) |
|         if( pic_max_mtt_hierarchy_depth_intra_slice_luma != 0 ) { | |
|             pic_log2_diff_max_bt_min_qt_intra_slice_luma | ue(v) |
|             pic_log2_diff_max_tt_min_qt_intra_slice_luma | ue(v) |
|         } | |
|         if( pic_max_mtt_hierarchy_depth_inter_slice != 0 ) { | |
|             pic_log2_diff_max_bt_min_qt_inter_slice | ue(v) |
|             pic_log2_diff_max_tt_min_qt_inter_slice | ue(v) |
|         } | |
|         if( qtbtt_dual_tree_intra_flag ) { | |
|             pic_log2_diff_min_qt_min_cb_intra_slice_chroma | ue(v) |
|             pic_max_mtt_hierarchy_depth_intra_slice_chroma | ue(v) |
|             if( pic_max_mtt_hierarchy_depth_intra_slice_chroma != 0 ) { | |
|                 pic_log2_diff_max_bt_min_qt_intra_slice_chroma | ue(v) |
|                 pic_log2_diff_max_tt_min_qt_intra_slice_chroma | ue(v) |
|             } | |
|         } | |
|     } | |
| } | |
| if( cu_qp_delta_enabled_flag ) { | |
|     pic_cu_qp_delta_subdiv_intra_slice | ue(v) |
|     pic_cu_qp_delta_subdiv_inter_slice | ue(v) |
| } | |
| if( pps_cu_chroma_qp_offset_list_enabled_flag ) { | |
|     pic_cu_chroma_qp_offset_subdiv_intra_slice | ue(v) |
|     pic_cu_chroma_qp_offset_subdiv_inter_slice | ue(v) |
| } | |
| if( sps_temporal_mvp_enabled_flag ) | |
|     pic_temporal_mvp_enabled_flag | u(1) |
| if(!pps_mvd_l1_zero_idc ) | |
|     mvd_l1_zero_flag | u(1) |
| if( !pps_six_minus_max_num_merge_cand_plus1 ) | |
|     pic_six_minus_max_num_merge_cand | ue(v) |
| if( sps_affine_enabled_flag ) | |
|     pic_five_minus_max_num_subblock_merge_cand | ue(v) |
| if( sps_fpel_mmvd_enabled_flag ) | |
|     pic_fpel_mmvd_enabled_flag | u(1) |
| if( sps_bdof_pic_present_flag ) | |
|     pic_disable_bdof_flag | u(1) |
| if( sps_dmvr_pic_present_flag ) | |
|     pic_disable_dmvr_flag | u(1) |
| if( sps_prof_pic_present_flag ) | |
|     pic_disable_prof_flag | u(1) |
| if( sps_triangle_enabled_flag && MaxNumMergeCand >= 2 && | |
|     !pps_max_num_merge_cand_minus_max_num_triangle_cand_plus1 ) | |
|     pic_max_num_merge_cand_minus_max_num_triangle_cand | ue(v) |
| if ( sps_ibc_enabled_flag ) | |
|     pic_six_minus_max_num_ibc_merge_cand | ue(v) |
| if( sps_joint_cbcr_enabled_flag ) | |
|     pic_joint_cbcr_sign_flag | u(1) |

TABLE 6-continued

| | Descriptor |
|---|---|
| if( sps_sao_enabled_flag ) { | |
|   pic_sao_enabled_present_flag | u(1) |
|   if( pic_sao_enabled_present_flag ) { | |
|     pic_sao_luma_enabled_flag | u(1) |
|     if(ChromaArrayType != 0 ) | |
|       pic_sao_chroma_enabled_flag | u(1) |
|     } | |
|   } | |
| if( sps_alf_enabled_flag ) { | |
|   pic_alf_enabled_present_flag | u(1) |
|   if( pic_alf_enabled_present_flag ) { | |
|     pic_alf_enabled_flag | u(1) |
|     if( pic_alf_enabled_flag ) { | |
|       pic_num_alf_aps_ids_luma | u(3) |
|       for( i = 0; i < pic_num_alf_aps_ids_luma; i++ ) | |
|         pic_alf_aps_id_luma[ i ] | u(3) |
|       if( ChromaArrayType != 0 ) | |
|         pic_alf_chroma_idc | u(2) |
|       if( pic_alf_chroma_idc ) | |
|         pic_alf_aps_id_chroma | u(3) |
|       } | |
|     } | |
|   } | |
| if ( pps_dep_quant_enabled_idc = = 0 ) | |
|   pic_dep_quant_enabled_flag | u(1) |
| if( !pic_dep_quant_enabled_flag ) | |
|   sign_data_hiding_enabled_flag | u(1) |
| if( deblocking_filter_override_enabled_flag ) { | |
|   pic_deblocking_filter_override_present_flag | u(1) |
|   if( pic_deblocking_filter_override_present_flag ) { | |
|     pic_deblocking_filter_override_flag | u(1) |
|     if( pic_deblocking_filter_override_flag ) { | |
|       pic_deblocking_filter_disabled_flag | u(1) |
|       if( !pic_deblocking_filter_disabled_flag ) { | |
|         pic_beta_offset_div2 | se(v) |
|         pic_tc_offset_div2 | se(v) |
|       } | |
|     } | |
|   } | |
| } | |
| if( sps_lmcs_enabled_flag ) { | |
|   pic_lmcs_enabled_flag | u(1) |
|   if( pic_lmcs_enabled_flag ) { | |
|     pic_lmcs_aps_id | u(2) |
|     if( ChromaArrayType != 0 ) | |
|       pic_chroma_residual_scale_flag | u(1) |
|   } | |
| } | |
| if( sps_scaling_list_enabled_flag ) { | |
|   pic_scaling_list_present_flag | u(1) |
|   if( pic_scaling_list_present_flag ) | |
|     pic_scaling_list_aps_id | u(3) |
| } | |
| if( picture_header_extension_present_flag ) { | |
|   ph_extension_length | ue(v) |
|   for( i = 0; i < ph_extension_length; i++) | |
|     ph_extension_data_byte[ i ] | u(8) |
| } | |
|   rbsp_trailing_bits( ) | |
| } | |

Further, according to an embodiment proposed in the present disclosure, for example, the slice layer RBSP may be signaled as follows.

TABLE 7

| | Descriptor |
|---|---|
| slice_layer_rbsp( ) { | |
|   if( !ph_nal_present_flag ) { | |
|     picture_header( ) | |
|     byte_alignment( ) | |
|   } | |

TABLE 7-continued

| | Descriptor |
|---|---|
|   slice_header( ) | |
|   slice data( ) | |
|   rbsp_slice_trailing_bits( ) | |
| } | |

Further, for example, according to an embodiment proposed in the present disclosure, one or more of the constraints shown in the following table may be applied.

TABLE 8

The following one or more constraints may be applied:
When ph_nal_present_flag is equal to 0, the value of picture_header_extension_present_flag shall be equal to 0.
It is a requirement of bitstream conformance that the value of pic_rpl_present_flag shall be equal to 1 when both conditions below are true:
- ph_nal_present_flag is equal to 0 and the picture associated with the PH is not an IDR picture.
- ph_nal_present_flag is equal to 0, the picture associated with the PH is an IDR picture, and sps_id_rpl_present_flag is equal to 1.
* rpl: reference picture list
It is a requirement of bitstream conformance that the value of pic_sao_enabled_present_flag shall be equal to 1 when the value of ph_nal_present_flag is equal to 0.
It is a requirement of bitstream conformance that the value of pic_alf_enabled_present_flag shall be equal to 1 when the value of ph_nal_present_flag is equal to 0.
It is a requirement of bitstream conformance that the value of pic_deblocking_filter_override_present_flag shall be equal to 1 when the value of ph_nal_present_flag is equal to 0.

For example, referring to Table 8, if ph_nal_present_flag is 0, the value of picture_header_extension_present_flag may be 0.

In addition, for example, when both the following conditions are true, it may be requirement for bitstream suitability that the value of pic_rpl_present_flag must be equal to 1.

ph_nal_present_flag is 0, and a picture associated with a PH is not an IDR picture.

ph_nal_present_flag is 0, a picture associated with a PH is an IDR picture, and sps_id_rpl_present_flag is equal to 1.

Here, rpl may mean a reference picture list.

In addition, for example, when the value of ph_nal_present_flag is 0, it may be requirement for bitstream suitability that the value of pic_sao_enabled_present_flag must be equal to 1.

Further, for example, when the value of ph_nal_present_flag is 0, it may be requirement for bitstream suitability that the value of pic_alf_enabled_present_flag must be equal to 1.

Further, for example, when the value of ph_nal_present_flag is 0, it may be requirement for bitstream suitability that the value of pic_deblocking_filter_override_present_flag must be equal to 1.

Meanwhile, for example, embodiment(s) may be applied according to the following procedure.

FIG. 5 schematically shows an encoding procedure according to an embodiment of the present disclosure.

Referring to FIG. 5, an encoding apparatus may generate NAL unit(s) including information on a picture (S500). The encoding apparatus may determine whether a NAL unit for a picture header is present (S510) and may decide whether a NAL unit for the picture header is present (S520).

For example, when a NAL unit for the picture header is present, the encoding apparatus may generate a bitstream including a VCL NAL unit including a slice header and a PH NAL unit including the picture header (S530).

Meanwhile, for example, when a NAL unit for the picture header is not present, the encoding apparatus may generate a bitstream including a VCL NAL unit including a slice header and a picture header (S540). That is, the picture header syntax structure may be present in the slice header.

Figure 6:
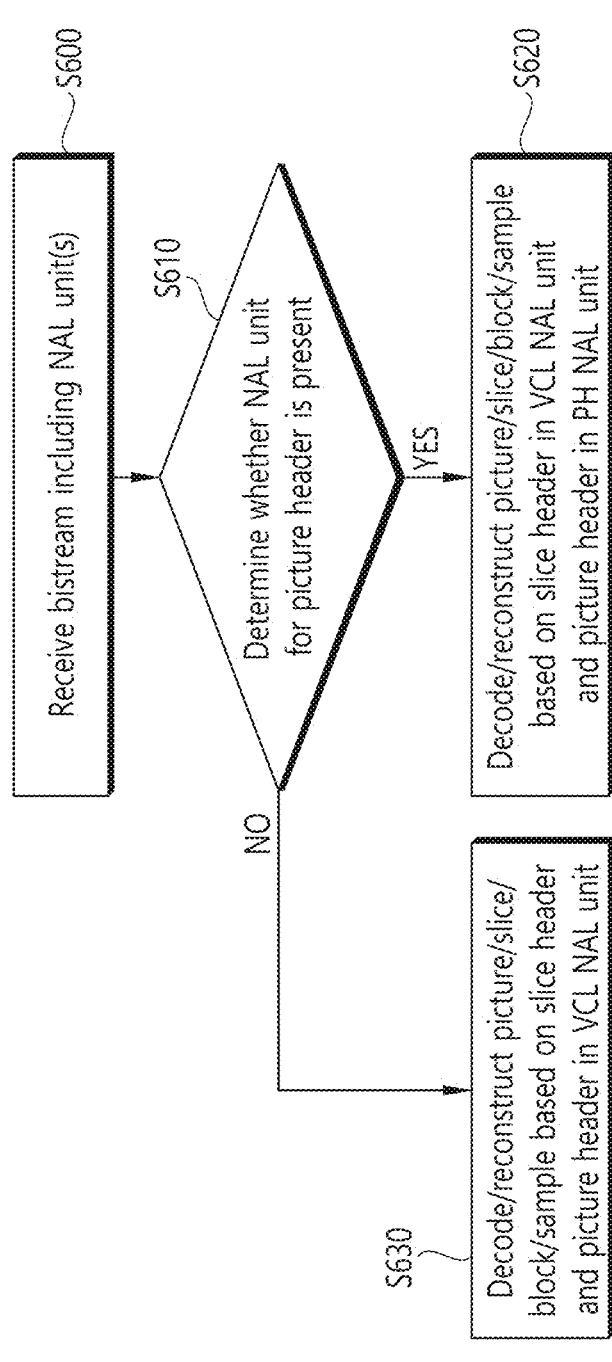
FIG. 6 schematically shows a decoding procedure according to an embodiment of the present disclosure.

FIG. 6 schematically shows a decoding procedure according to an embodiment of the present disclosure.

Referring to FIG. 6, a decoding apparatus may receive a bitstream including NAL unit(s) (S600). Thereafter, the decoding apparatus may determine whether a NAL unit for a picture header is present (S610).

For example, when a NAL unit for the picture header is present, the decoding apparatus may decode/reconstruct a picture/slice/block/sample based on a slice header in a VCL NAL unit and the picture header in a PH NAL unit (S620).

Meanwhile, for example, when a NAL unit for the picture header is not present, the decoding apparatus may decode/reconstruct a picture/slice/block/sample based on a slice header and a picture header in a VCL NAL unit (S630).

Here, the (coded) bitstream may include one or more NAL units for decoding a picture. In addition, the NAL unit may be a VCL NAL unit or a non-VCL NAL unit. For example, the VCL NAL unit may include information on a coded slice, and the VAL NAL unit may have a NAL unit type having the NAL unit type class "VCL" shown in Table 1 above.

Meanwhile, according to the embodiment proposed in the present disclosure, the bitstream may include a PH NAL unit (a NAL unit for a picture header) or the bitstream may not include a PH NAL unit for the current picture. Information indicating whether a PH NAL unit is present (e.g., ph_nal_present_flag) may be signaled through an HLS (e.g., a VPS, a DPS, an SPS, a slice header, or the like).

FIG. 7 schematically shows a picture header configuration in a NAL unit according to presence or absence of a PH NAL unit. For example, (a) of FIG. 7 shows a case in which a PH NAL unit for the current picture is present, and (b) of FIG. 7 shows a case in which a PH NAL unit for the current picture is not present but a picture header is included in a VCL NAL unit.

For example, when the PH NAL unit is present, the picture header may be included in the PH NAL unit. On the other hand, when the PH NAL unit is not present, the picture header may still be configured but may be included in another type of NAL unit. For example, the picture header may be included in a VCL NAL unit. The VCL NAL unit may include information on a coded slice. A VCL unit may include a slice header for a coded slice. For example, when a specific slice header includes information representing that a coded/associated slice is the first slice in a picture or a subpicture, the picture header may be included in a specific VAL NAL unit including the specific slice header. Or, for example, when the PH NAL unit is not present, the picture header may be included in a non-VCL NAL unit such as a PPS NAL unit, an APS NAL unit, or the like.

Figure 8:
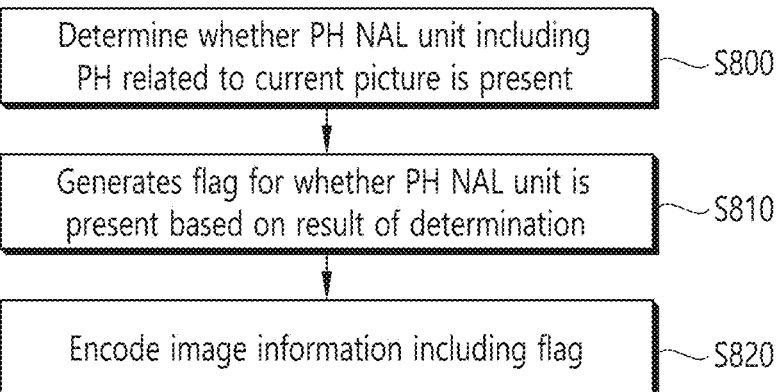
FIG. 8 schematically shows an image encoding method by an encoding apparatus according to the present document.

FIG. 8 schematically shows an image encoding method by an encoding apparatus according to the present document. The method disclosed in FIG. 8 may be performed by the encoding apparatus illustrated in FIG. 2. Specifically, for example, S800 to S820 of FIG. 8 may be performed by the entropy encoder of the encoding apparatus. Further, although not shown, the process of decoding the current picture may be performed by the predictor and the residual processor of the encoding apparatus.

The encoding apparatus determines whether a Picture Header (PH) Network Abstraction Layer (NAL) unit including a PH related to a current picture is present (S800). The encoding apparatus may generates a NAL unit for a current picture. For example, the NAL unit for the current picture may include a PH NAL unit including a PH related to the current picture and/or a Video Coded Layer (VCL) NAL unit including information on a slice in the current picture (e.g., a slice header and slice data). The encoding apparatus may determine whether the PH NAL unit is present. For example, when the PH NAL unit is present, the encoding apparatus may generate a PH NAL unit including a PH related to the current picture and/or a Video Coded Layer (VCL) NAL unit including information on slices of the current picture (e.g., slice header and slice data). Also, for example, when the PH NAL unit is not present, the encoding apparatus may generate a Video Coded Layer (VCL) NAL unit including a PH related to the current picture and information on one slice of the current picture (e.g., slice header and slice data). Further, for example, when the flag represents that the PH NAL unit is not present, the current picture may include one slice. Here, for example, the PH may include syntax elements representing parameters for the current picture.

The encoding apparatus generates a flag for whether the PH NAL unit is present based on a result of the determination (S810). For example, the encoding apparatus may generate a flag for whether the PH NAL unit is present based on the determination result. For example, the flag may represent whether the PH NAL unit is present. For example, when the value of the flag is 1, the flag may represent that the PH NAL unit is present, and when the value of the flag is 0, the flag may represent that the PH NAL unit is not present. Alternatively, for example, when the value of the flag is 0, the flag may represent that the PH NAL unit is present, and when the value of the flag is 1, the flag may represent that the PH NAL unit is not present. The syntax element of the flag may be the above-described ph_nal_present_flag.

The encoding apparatus encodes image information including the flag (S820). The encoding apparatus may encode the image information including the flag. The image information may include the flag. Further, for example, the image information may include a high-level syntax, and the flag may be included in the high-level syntax. For example, the high-level syntax may be a sequence parameter set (SPS). Or, for example, the high-level syntax may be a slice header (SH). That is, for example, the flag may be included in the slice header.

Meanwhile, for example, the PH may be included in the PH NAL unit when the flag represents that the PH NAL unit is present, and the PH may be included in the slice header related to the current picture when the flag represents that the PH NAL unit is not present. For example, the PH may be included in the PH NAL unit when the flag represents that the PH NAL unit is present, and the PH may be included in a VCL NAL unit including a slice header when the flag represents that the PH NAL unit is not present. That is, for example, the PH may be included in the PH NAL unit when the flag represents that the PH NAL unit is present, and the PH may be included in the slice header when the flag represents that the PH NAL unit is not present. For example, the image information may include the PH NAL unit including the PH and at least one VCL NAL unit including the slice header related to the current picture when the flag represents that the PH NAL unit is present, and the image information may include a VCL NAL unit including the PH and the slice header when the flag represents that the PH NAL unit is not present. Further, for example, when the flag represents that the PH NAL unit is not present, the image information may not include the PH NAL unit.

Further, for example, when the flag represents that the PH NAL unit is not present, a PH NAL unit may not be present for all pictures in a coded video layer sequence (CLVS) including the current picture. That is, for example, flags representing for whether a PH NAL unit is present for all pictures in a coded video layer sequence (CLVS) may have the same value. Further, for example, when the flag represents that the PH NAL unit is not present, picture headers for all pictures in the CLVS may be included in slice headers of all the pictures.

Meanwhile, for example, AU detection may be modified from the existing method. For example, a new VCL NAL unit may mean a new AU. That is, for example, when the flag represents that the PH NAL unit is not present, the VCL NAL unit including the slice header may be the first VCL NAL unit of the current picture (for a new AU (i.e., AU for the current picture)). For example, the flag may be included in the slice header of the VCL NAL unit. Or, for example, when the flag represents that the PH NAL unit is present, it may be the first VCL NAL unit of the current picture which follows the PH NAL unit, that is, is signaled after the PH NAL unit.

Meanwhile, the encoding apparatus may decode the current picture. For example, the encoding apparatus may decode the current picture based on the syntax elements of the PH. For example, the syntax elements of the PH may be the syntax elements shown in Table 6. The PH may include syntax elements representing parameters for the current picture, and the encoding apparatus may decode the current picture based on the syntax elements. Also, for example, a VCL NAL unit including the slice header may include slice data for a slice in the current picture, the encoding apparatus may decode the slice in the current picture based on the slice data. For example, the decoding apparatus may derive a prediction sample and a residual sample of the current picture, and generate a reconstructed sample/reconstructed picture based on the prediction sample and the residual sample.

Meanwhile, for example, the encoding apparatus may generate and encode prediction information for a block in the current picture. In this case, various prediction methods disclosed in the present disclosure, such as inter-prediction or intra-prediction, may be applied. For example, the encoding apparatus may determine whether to perform inter-prediction or intra-prediction on the block and may determine a specific inter-prediction mode or a specific intra-prediction mode based on RD cost. According to the determined mode, the encoding apparatus may derive a prediction sample for the block. The prediction information may include prediction mode information for the block. The image information may include the prediction information.

Further, for example, the encoding apparatus may encode the residual information for the block of the current picture.

For example, the encoding apparatus may derive a residual sample by subtracting the prediction sample from the original sample for the block.

Then, for example, the encoding apparatus may quantize the residual sample to derive a quantized residual sample, may derive a transform coefficient based on the quantized residual sample, and generate and encode the residual information based on the transform coefficient. Alternatively, for example, the encoding apparatus may quantize the residual sample to derive a quantized residual sample, transform the quantized residual sample to derive a transform coefficient, and generate and encode the residual information based on the transform coefficient. The image information may include the residual information. Also, for example, the encoding apparatus may encode image information and output the encoded image information in the form of a bitstream.

The encoding apparatus may generate reconstructed samples and/or a reconstructed picture through addition of the prediction samples and the residual samples. As described above, an in-loop filtering procedure such as deblocking filtering, SAO, and/or ALF procedure may be applied to the reconstructed samples to improve subjective/objective picture quality.

Meanwhile, a bitstream including the image information may be transmitted to a decoding apparatus through a network or a (digital) storage medium. Here, the network may include a broadcasting network and/or a communication network, and the digital storage medium may include various storage media such as a USB, an SD, a CD, a DVD, Blu-ray, an HDD, and an SSD.

Figure 9:
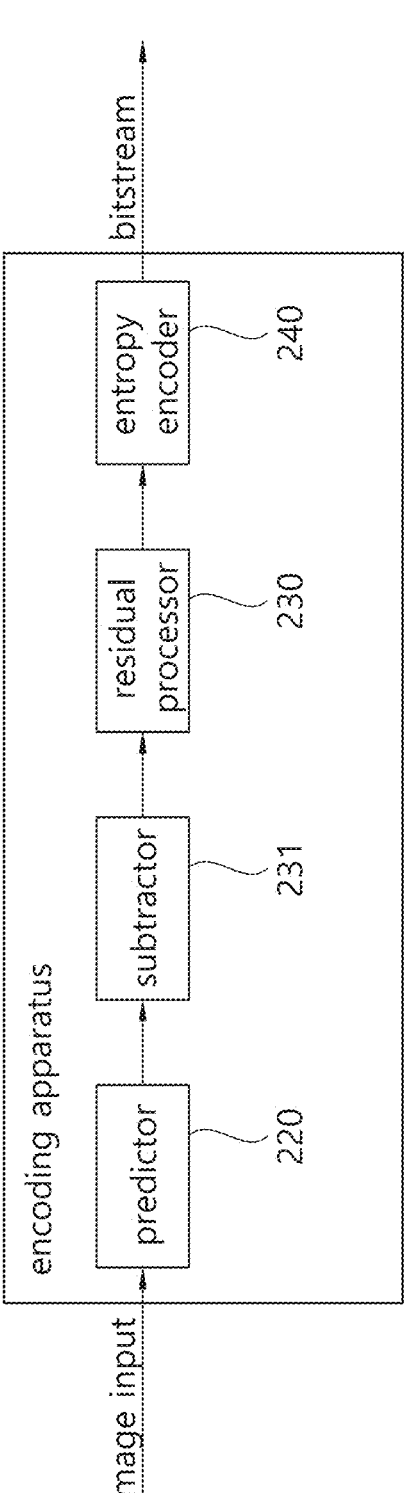
FIG. 9 schematically shows an encoding apparatus for performing an image encoding method according to this document.

FIG. 9 schematically shows an encoding apparatus for performing an image encoding method according to this document. The method illustrated in FIG. 8 may be performed by the encoding apparatus illustrated in FIG. 9. Specifically, for example, the entropy encoder of the encoding apparatus of FIG. 9 may perform S800 to S820. Although not shown, the process of decoding the current picture may be performed by the predictor and the residual processor of the encoding apparatus.

Figure 10:
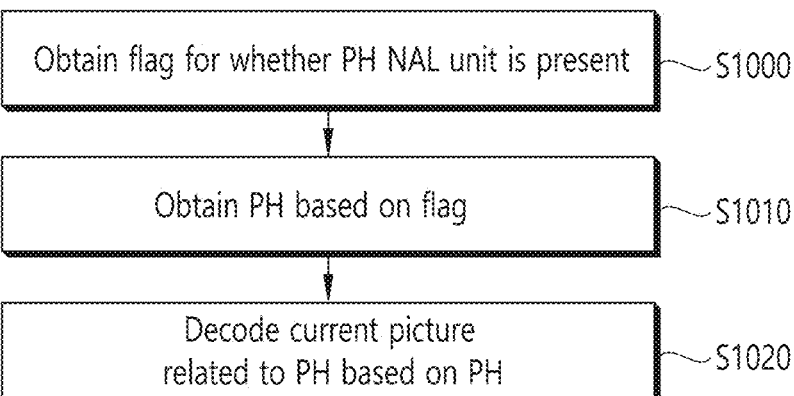
FIG. 10 schematically shows an image decoding method by a decoding apparatus according to this document.

FIG. 10 schematically shows an image decoding method by a decoding apparatus according to this document. The method illustrated in FIG. 10 may be performed by the decoding apparatus illustrated in FIG. 3. Specifically, for example, S1000 to S1010 of FIG. 10 may be performed by the entropy decoder of the decoding apparatus, and S1020 of FIG. 10 may be performed by the predictor and the residual processor of the decoding apparatus.

The decoding apparatus obtains a flag for whether a Picture Header (PH) Network Abstraction Layer (NAL) unit is present (S1000). The decoding apparatus may obtain a flag for whether a Picture Header (PH) Network Abstraction Layer (NAL) unit is present through a bitstream. For example, the decoding apparatus may obtain the image information through the bitstream, and the image information may include the flag. Also, for example, the image information may include a high-level syntax, and the flag may be included in the high-level syntax. For example, the high-level syntax may be a sequence parameter set (SPS). Or, for example, the high-level syntax may be a slice header (SH). That is, for example, the flag may be included in the slice header.

For example, the flag may represent whether the PH NAL unit is present. For example, when the value of the flag is 1, the flag may represent that the PH NAL unit is present, and when the value of the flag is 0, the flag may represent that the PH NAL unit is not present. Alternatively, for example, when the value of the flag is 0, the flag may represent that the PH NAL unit is present, and when the value of the flag is 1, the flag may represent that the PH NAL unit is not present. The syntax element of the flag may be the above-described ph_nal_present_flag.

The decoding apparatus obtains a PH based on the flag (S1010). The decoding apparatus may obtain the PH from the PH NAL unit or a VCL NAL unit including a slice header based on the flag. That is, for example, the decoding apparatus may obtain the PH from the PH NAL unit or the slice header based on the flag.

For example, the PH may be obtained from the PH NAL unit when the flag represents that the PH NAL unit is present, and the PH may be obtained from the slice header when the flag represents that the PH NAL unit is not present. For example, the PH may be included in the PH NAL unit when the flag represents that the PH NAL unit is present, and the PH may be included in the VCL NAL unit including the slice header when the flag represents that the PH NAL unit is not present. That is, for example, the PH may be included in the PH NAL unit when the flag represents that the PH NAL unit is present, and the PH may be included in the slice header when the flag represents that the PH NAL unit is not present. For example, the image information may include the PH NAL unit including the PH and the VCL NAL unit including the slice header when the flag represents that the PH NAL unit is present, and the image information may include a VCL NAL unit including the PH and the slice header when the flag represents that the PH NAL unit is not present. Further, for example, when the flag represents that the PH NAL unit is not present, the image information may not include a PH NAL unit.

Further, for example, when the flag represents that the PH NAL unit is not present, the current picture for the PH may include one slice. That is, for example, when the flag represents that the PH NAL unit is not present, the image information may include a VCL NAL unit including a slice header for one slice in the current picture.

Further, for example, when the flag represents that the PH NAL unit is present, the PH NAL unit for the current picture and at least one VCL NAL unit including the slice header for the current picture may be obtained through the bitstream. That is, for example, when the flag represents that the PH NAL unit is present, the image information may include the PH NAL unit for the current picture and a VCL NAL unit including a slice header for at least one slice in the current picture.

Further, for example, when the flag represents that the PH NAL unit is not present, a PH NAL unit may not be present for all pictures in a coded video layer sequence (CLVS) including the current picture. That is, for example, flags representing whether a PH NAL unit is present for all pictures in the coded video layer sequence (CLVS) may have the same value. Further, for example, when the flag represents that the PH NAL unit is not present, picture headers for all the pictures in the CLVS may be included in slice headers of all the pictures.

Meanwhile, for example, AU detection may be modified from the existing method. For example, a new VCL NAL unit may mean a new AU. That is, for example, when the flag represents that the PH NAL unit is not present, the VCL NAL unit including the slice header may be the first VCL NAL unit of the current picture (for a new AU (i.e., AU for the current picture)). For example, the flag may be included in the slice header of the VCL NAL unit. Or, for example, when the flag represents that the PH NAL unit is present, it may be the first VCL NAL unit of the current picture which follows the PH NAL unit, that is, is signaled after the PH NAL unit.

The decoding apparatus decodes a current picture related to the PH based on the PH (S1020). The decoding apparatus may decode the current picture based on syntax elements of the PH. For example, the syntax elements of the PH may be the syntax elements shown in Table 6. The PH may include syntax elements representing parameters for the current picture, and the decoding apparatus may decode the current picture based on the syntax elements. Also, for example, a VCL NAL unit including the slice header may include slice data for a slice in the current picture, the decoding apparatus may decode the slice in the current picture based on the slice data. For example, the decoding apparatus may derive a prediction sample and a residual sample of the current picture, and generate a reconstructed sample/reconstructed picture for the current picture based on the prediction sample and the residual sample.

As described above, an in-loop filtering procedure such as deblocking filtering, SAO and/or ALF procedure may be applied to the reconstructed samples in order to improve subjective/objective picture quality as necessary.

Figure 11:
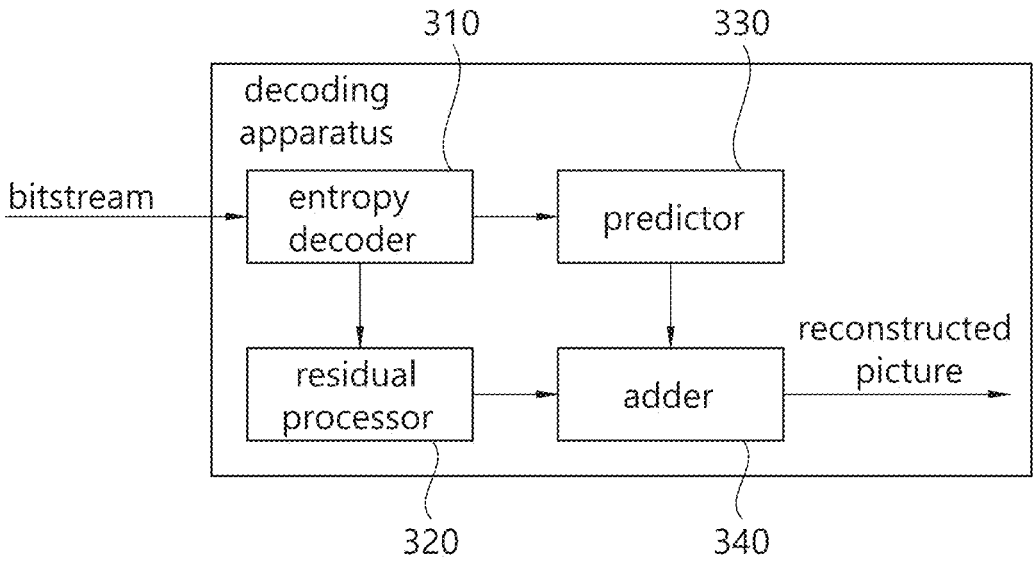
FIG. 11 schematically shows a decoding apparatus for performing an image decoding method according to this document.

FIG. 11 schematically shows a decoding apparatus for performing an image decoding method according to this document. The method illustrated in FIG. 10 may be performed by the decoding apparatus illustrated in FIG. 11. Specifically, for example, the entropy decoder of the decoding apparatus of FIG. 11 may perform S1000 to S1010 of FIG. 10, and the predictor and the residual processor of the decoding apparatus of FIG. 11 may perform S1020 of FIG. 10.

According to the present disclosure described above, it is possible to signal the flag representing presence or absence of a PH NAL unit, to adjust a NAL unit adaptively to the bit rate of a bitstream based on the flag, and to improve overall coding efficiency.

In addition, according to the present disclosure, it is possible to set a constraint on the number of slices in the current picture and a constraint on presence or absence of a PH NAL unit for related pictures based on the flag representing presence or absence of a PH NAL unit and to control a NAL unit adaptively to the bit rate, thereby improving the overall coding efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VOD service providing apparatus, an Over the top (OTT) video apparatus, an Internet streaming service providing apparatus, a three-dimensional (3D) video apparatus, a tele-conference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 12:
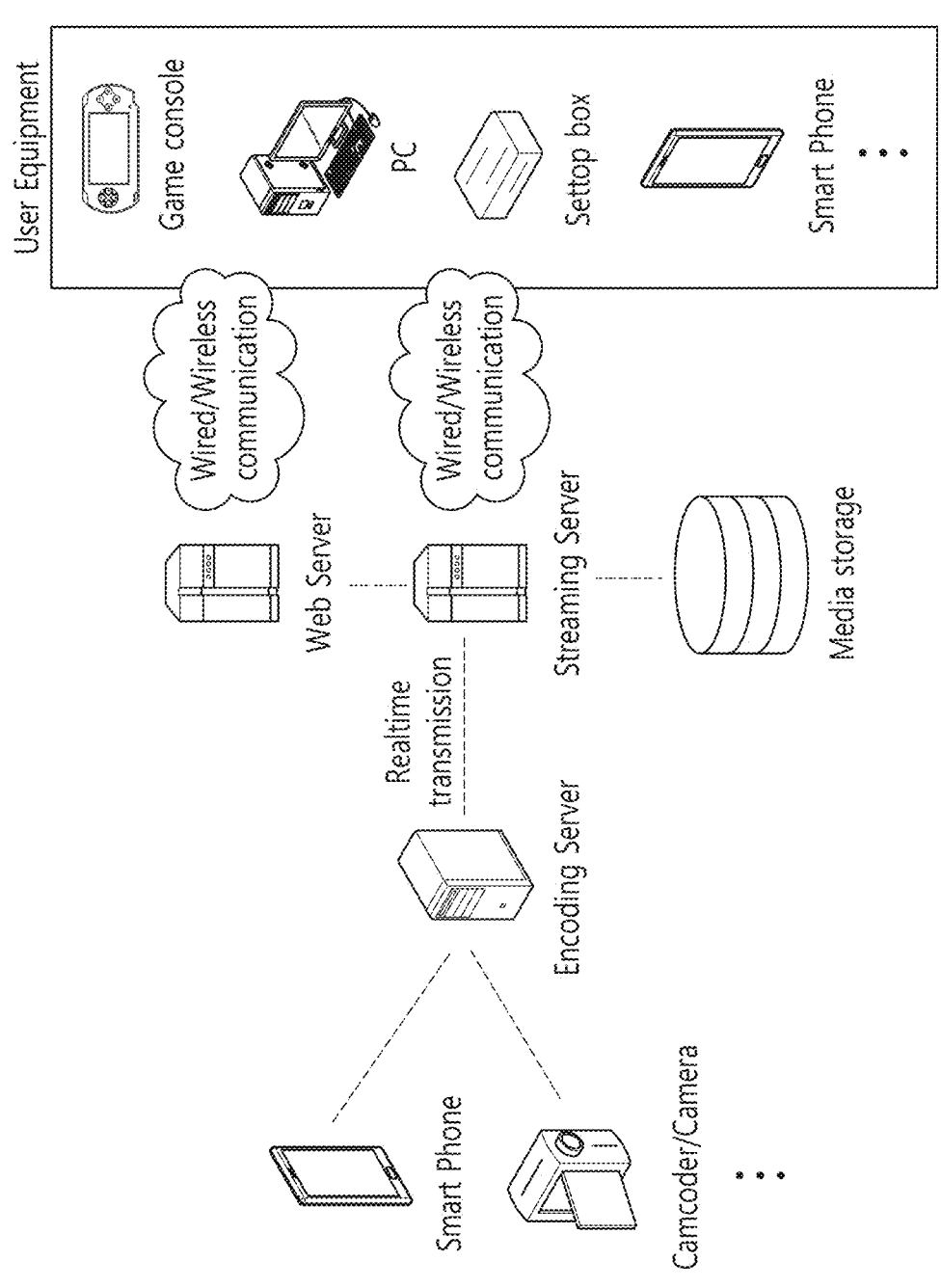
FIG. 12 illustrates a structural diagram of a contents streaming system to which the present disclosure is applied.

FIG. 12 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. A decoding apparatus for image decoding, the decoding apparatus comprising:

a memory; and at least one processor connected to the memory, the at least one processor configured to:

obtain a flag for whether a Picture Header (PH) Network Abstraction Layer (NAL) unit is present;

based on the flag representing that the PH NAL unit is present, obtain a PH for a current picture from the PH NAL unit;

based on the flag representing that the PH NAL unit is not present, obtain the PH for the current picture from a slice header for the current picture; and decode the current picture based on the PH, wherein based on the flag representing that the PH NAL unit is not present, the current picture includes only one slice.

2. An encoding apparatus for image encoding, the encoding apparatus comprising:

a memory; and at least one processor connected to the memory, the at least one processor configured to:

determine whether a Picture Header (PH) Network Abstraction Layer (NAL) unit including a PH related to a current picture is present;

based on the determination that the PH NAL unit is present, generate the PH NAL unit including the PH;

based on the determination that the PH NAL unit is not present, generate a slice header for the current picture including the PH;

generate a flag for whether the PH NAL unit is present based on a result of the determination; and encode image information including the flag, wherein based on the flag representing that the PH NAL unit is not present, the current picture includes only one slice.

3. An apparatus for a bitstream of image information, the apparatus comprising:

at least one processor configured to generate the bitstream, based on the image information comprising a flag for whether a Picture Header (PH) Network Abstraction Layer (NAL) unit is present; and a transmitter configured to transmit the bitstream of the image information comprising the flag, wherein based on the flag representing that the PH NAL unit is present, a PH for a current picture is obtained from the PH NAL unit, wherein based on the flag representing that the PH NAL unit is not present, the PH for the current picture is obtained from a slice header for the current picture, and wherein based on the flag representing that the PH NAL unit is not present, the current picture includes only one slice.

* * * * *